Aug. 15, 1944.   H. C. TANGOWSKI   2,356,100
NUT TAPPING MACHINE
Filed May 22, 1943   2 Sheets-Sheet 1

INVENTOR
HENRY C. TANGOWSKI
BY
Horace B. Van Valkenburgh
ATTORNEY

Aug. 15, 1944. H. C. TANGOWSKI 2,356,100
NUT TAPPING MACHINE
Filed May 22, 1943 2 Sheets-Sheet 2
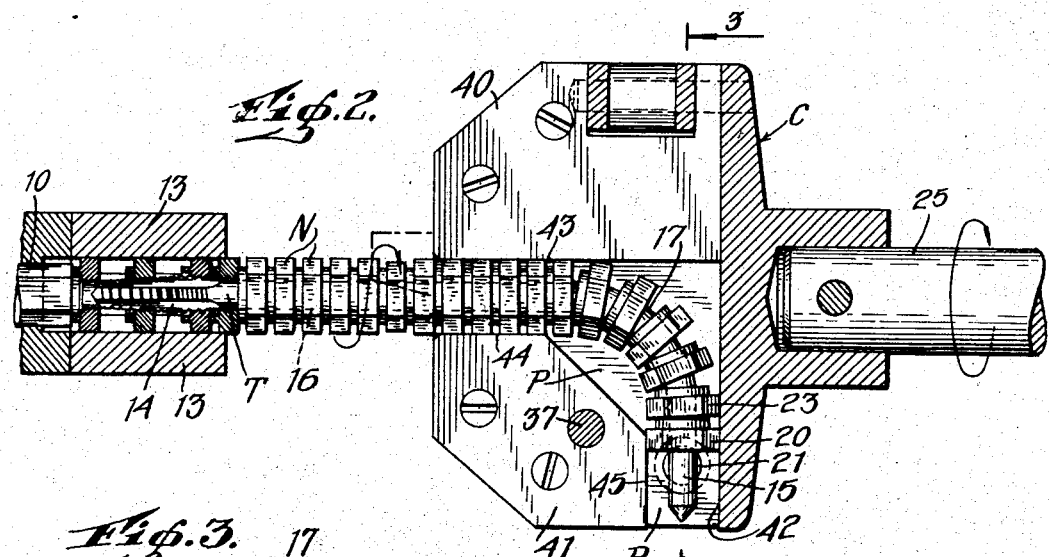
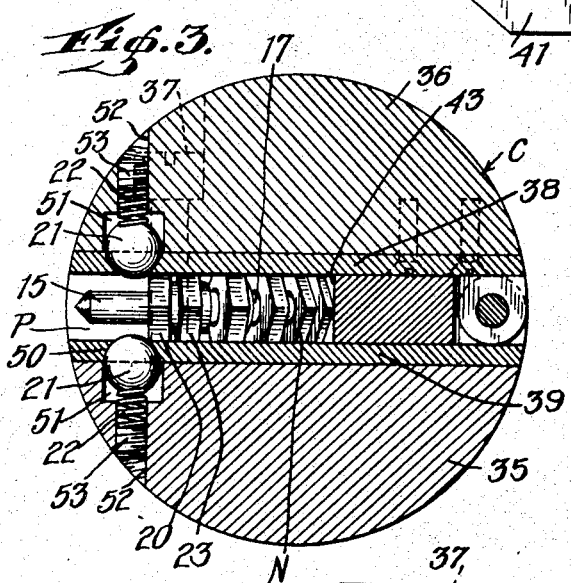
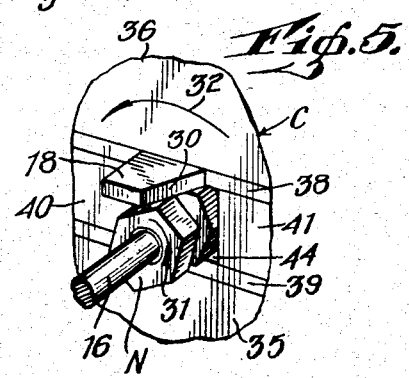
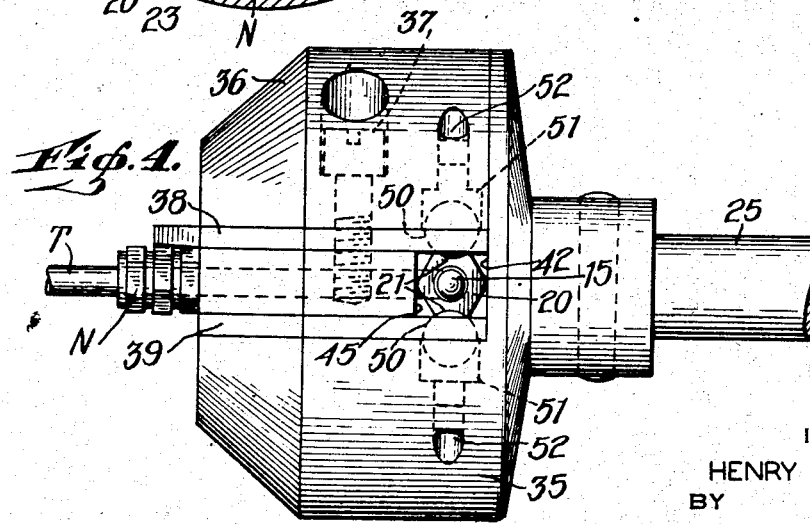
INVENTOR
HENRY C. TANGOWSKI
BY
Horace B. Van Valkenburgh
ATTORNEY Patented Aug. 15, 1944

2,356,100

UNITED STATES PATENT OFFICE 2,356,100

NUT TAPPING MACHINE

Henry C. Tangowski, Elizabeth, N. J., assignor to Elastic Stop Nut Corporation of America, a corporation of New Jersey Application May 22, 1943, Serial No. 487,998

1 Claim. (Cl. 10—139)

This invention relates to machine tools and methods of securing better performances of the same. This invention more particularly relates to machine tools such as automatic tappers, reamers, or the like, wherein a plurality of articles pass, in succession, along a predetermined path through a rotating or moving tool holder.

The principles of this invention are applicable, for example, to an automatic nut tapper of a type wherein the tap is provided with a threaded entrance section and a curve leading to the discharge section, which is disposed at an angle, such as 90°, to the entrance section. A portion of the tap, including the curve and the discharge section, lies in a passage in a rotating chuck, the tap rotating with the chuck and successive nuts being pushed onto the threaded section of the tap. The nuts move along the tap through the passage, contacting the walls of the passage to hold the tap in position, and are discharged from the exit end of the passage in the side of the chuck.

In such a tapper, difficulty is experienced in achieving a uniform discharge of nuts. It is important that such discharge be uniform—otherwise the nuts tend to jam on the top, or too many articles are discharged, thereby removing the only means for holding the tap accurately in alignment. Thus, a primary object of this invention is to provide an improved method and suitable means for obtaining a substantially uniform flow of articles from a tool which is held in alignment in a passage in a moving tool holder by articles passing therealong.

Other objects include the provision of means for producing substantially equalized detaining forces on an article tending to be discharged from such a tool; the provision of such means which, when the detaining force is overcome, tends to eject the article; the provision of means which will tend to keep an article in alignment in a passage in a tool holder in which the tool is disposed; and the provision of a detainer of the foregoing type which is relatively simple in construction and is easily adaptable to varied forms of tool holders, being particularly adaptable to a rotatable chuck having a passage for receiving a tap with a 90° bend therein. Additional objects include the provision of an improved method whereby articles may be discharged in a more effective manner from a passage in a moving holder for a tool along which the articles pass; the provision of such a method whereby restraining forces are more effectively applied; and the provision of such a method wherein restraining forces are applied at a point or points such that numerous previous difficulties are overcome. Further objects and the novel features of this invention will become apparent from the following description and accompanying drawings, in which:

Fig. 2 is a longitudinal section of the apparatus of Fig. 1;

Fig. 3 is a cross-section taken along line 3—3 of Fig. 2, through the exit end of the passage in a tap chuck;

Fig. 4 is a longitudinal view of the chuck; and

Fig. 5 is a fragmentary perspective view of a portion of the chuck around the entrance to the tap passage, to illustrate the manner in which the nuts are moved into alignment with the tap passage as they enter the rotating chuck.

Figure 1:
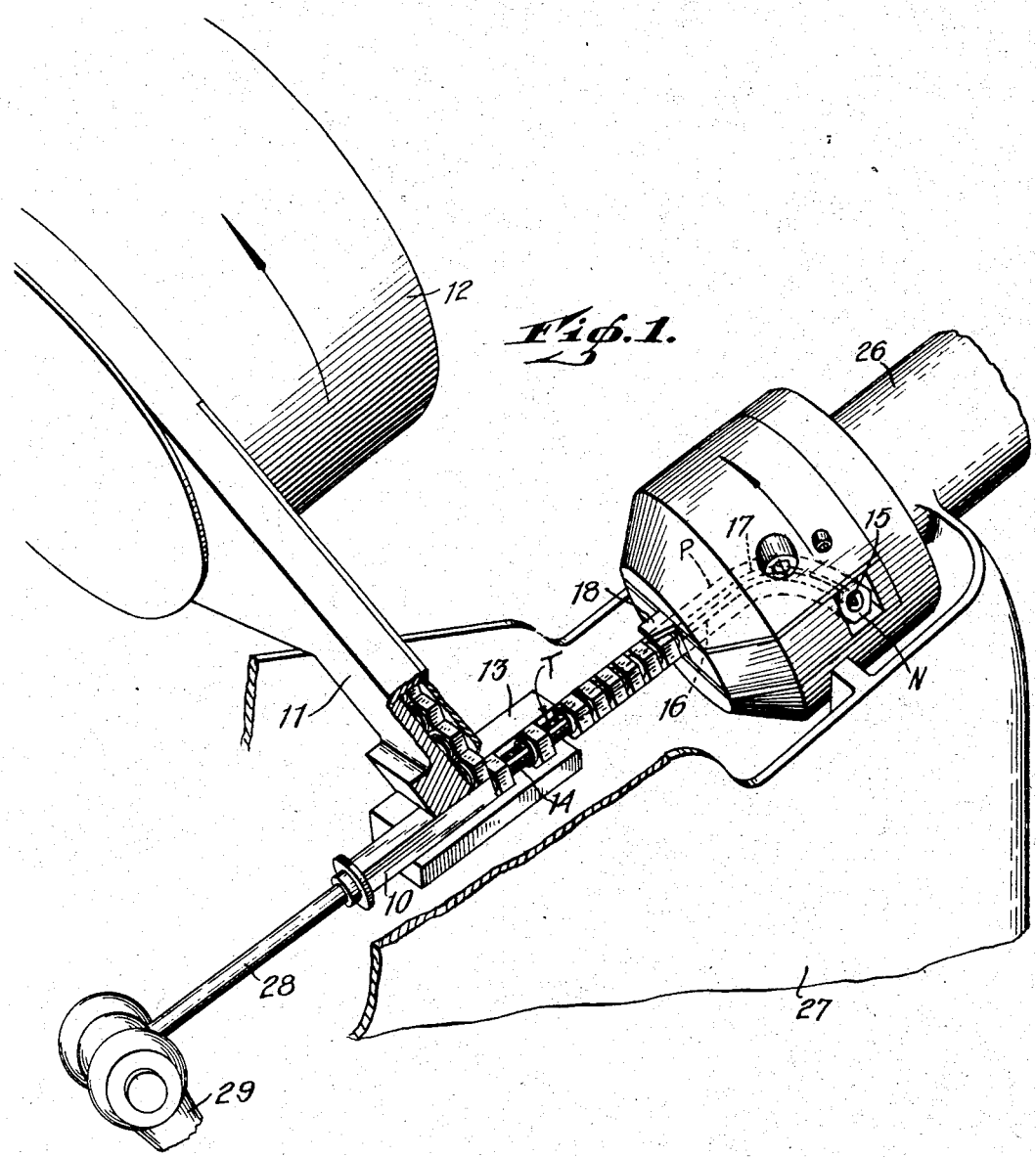
Fig. 1 is a perspective view of an automatic tapping apparatus, including an embodiment of this invention.

In automatic tapping apparatus of a type to which the principles of this invention are particularly applicable, as shown in Fig. 1, a plurality of nuts N are pushed onto a tap T by a reciprocating hexagonal plunger 10. The nuts are fed to the plunger through a chute 11, leading from a selective hopper 12, and are held from rotating in a polygonal space formed by jaws 13, a portion of the jaws being omitted in Fig. 1, for clarity of illustration. The tap T is provided with a threaded entrance section 14 at one end, and an exit section 15 at the opposite end, disposed at 90° to the entrance section, with a smooth axial section 16 and a curve 17 therebetween and adjoining the entrance and exit sections, respectively. The tap is rotated by a chuck C, the tap lying in passage P in the chuck, which follows in general the configuration of the tap.

As successive nuts are fed onto the rotating tap, threads are formed in the bores thereof, and as the nuts pass up the tap and beyond the threaded entrance section, they push the preceding nuts along the tap and into the rotating chuck. The nuts are brought into alignment with the side walls of passage P by an ear 18, in a manner described later.

The tap itself does not touch the side walls of the passage P, being held in alignment therein by the column of nuts. As each nut comes to the exit section 15 of the tap, after moving around curve 17, it tends to be thrown off and out of the passage by centrifugal force, as in Fig. 1. As the exit section, as well as the axial section, of the tap would otherwise soon become devoid of nuts—thus leaving the tap unsupported, to become misaligned and then become overstressed and crack or break in the threaded section—it is necessary to restrain movement of the nuts off the exit section, and depend upon the force of succeeding nuts pushed along the tap from the threaded section to discharge nuts from the tap.

In accordance with the method of this invention, substantially equal restraining forces are exerted against an article at two or more points spaced symmetrically about the passage through which the article passes, and at points spaced sufficiently from the exit end of the passage so that after the restraining force is overcome, the article will travel along at least a portion of the tool before being finally discharged. In the case of a tool having an exit section disposed at an angle to the entrance section, as in the case of the tap T, the points at which the restraining forces are exerted are preferably sufficiently close to the end of the tool, so that the articles will contact the wall of the passage for a sufficient distance along the exit section of the tool to maintain the tool accurately in alignment. The restraining forces are applied at two or more points disposed symmetrically about the passage, to prevent any tendency for turning or misalignment of the article. In the case of articles such as nut N and tools such as tap T, the restraining forces are preferably sufficiently great to overcome the tendency for the nuts to be thrown out of the passage and off the tap by centrifugal force, yet not so strong as to hinder unduly the ready movement of nuts along the tap. For example, the restraining forces may be sufficient to prevent a nut from being discharged from the tap by centrifugal force, but readily permit a nut to be discharged when it is pushed along by another nut moving from the threaded entrance section 14 to the unthreaded axial section 16, albeit insufficient to cause the nuts to crowd together and jam along curve 17.

In further accordance with this invention, additional forces may be imposed upon the article subsequent to or at the time the restraining forces are overcome, which additional forces tend to eject the article from the tool holder. Such additional forces are preferably also exerted at two or more points disposed symmetrically about the periphery of the article and equidistantly from the end of the passage, but spaced sufficiently from the end of the tool so that each article will travel along at least a small portion of the exit end of the tool before being finally discharged. Such forces cause the articles to be quickly, evenly, and uniformly discharged, thereby further overcoming any tendency for misalignment or twisting as the end of the tool is reached. Also, when the last nut is quickly discharged after the restraining force is overcome, the next nut moves easily and without hindrance up to the restraining means.

In an embodiment adapted to carry out the method of this invention, as illustrated in Figs. 2 to 4, inclusive, the chuck C is provided with resilient restraining means, constructed in accordance with this invention and disposed adjacent the end of passage P, for exerting restraining forces, from at least two sides upon the last nut 20 on the tap. Such restraining means may comprise a pair of similar or substantially identical detent balls 21, disposed on opposite sides of the passage and pressed inwardly by springs 22, also preferably similar or substantially identical. Balls 21 are spaced a sufficient distance from the end of the tap, so that the nut 20 will have little opportunity to become misaligned in overcoming the restraining force, but the balls are also spaced a sufficient distance from the end of curve 17 to permit nut 20 and the next succeeding nut 23 to maintain the exit end of the tap in the desired spaced relation to the passage. When the restraining force is overcome and the nut 20 moves along the tap, the detent balls will eject nut 20 with a snap action, and simultaneously hold the nut 23, which then becomes the last nut, until another nut moves from the threaded section 14 onto unthreaded section 16.

Referring again to more conventional details, chuck C is secured to the overhanging end of a shaft 25, which is rotated by suitable means, and is supported adjacent the chuck by a bearing 26, as in Fig. 1, which may comprise part of a casting forming a supporting housing 27. Housing 27 (only the lower half of which is shown in Fig. 1) not only provides support for the parts, but a portion thereof surrounds the chuck, to catch the nuts discharged therefrom. The nuts may flow from the housing to a suitable trough, bin, or other collecting device.

Plunger 10 is reciprocated, through a rod 28, by a crank arm 29 which may be actuated by suitable known mechanism. The rate and amplitude of reciprocation of arm 29 are adjustable in any well-known manner, while the longitudinal position of plunger 10 is adjustable by a threaded connection between rod 28 and the plunger. The reciprocation of plunger 10 is adjusted so that a nut will be pushed onto the tap, the plunger will withdraw, another nut will fall into place before the plunger from the feed chute 11, and the plunger will push this nut onto the tap, leaving a sufficient distance between nuts so that they do not become jammed on the threaded entrance section 14.

As the nuts move along threaded section 14, they are prevented from rotating by jaws 13, but after the nuts pass from the threaded entrance section 14, they are free to begin rotating or spinning on the smooth axial section 16. However, the nuts normally do not begin rotating at the same rate as the tap and chuck until they reach ear 18. As in Fig. 5, ear 18 is provided with a beveled edge 30 to provide a more gradual catching of the nut—which is rotating in the same direction as the chuck but normally at a slower rate, so that it tends to rotate relative to the chuck in the direction of the arrow 31. At the same time, both the nut and the chuck are rotating in the direction of the arrow 32—and as the ear 18, as it were, catches up with the nut, the underside of the ear rotates the nut to bring the nut into alignment with the walls of passage P.

Chuck C includes a block 35 to which is hinged a cover 36, which may be secured in the closed position by suitable means, such as a machine screw 37. Passage P may be rectangular in shape, so that two opposite sides of the hex of nuts N will engage the upper and lower walls of the passage, the nuts thereby being held from turning and also keeping tap T in alignment in one transverse direction, and so that the meeting edges of the other two pairs of sides of the hex of the nuts will contact the side walls of the passage along tap sections 15 and 16, to maintain the tap in alignment in the other transverse and the longitudinal directions. The side walls of the passage may, if desired, follow the curve 17, but need not do so, as shown in Fig. 2, since the upper and lower walls prevent the nuts from turning in moving around the curve, and the tap is already held in alignment, by other wall portions of the passage, in the three directions corresponding to the X, Y, and Z conventional geometrical axes.

The upper and lower walls of the passage are formed by a pair of plates 38 and 39, plate 38 being attached to cover 36 and plate 39 to block 35 in a suitable manner, as by machine screws. Ear 18 may be formed as an extension of plate 38, or secured thereto in a suitable manner. The side walls of passage P are formed by a pair of spacing blocks 40 and 41, and the front face 42 of block 35. More specifically, one side wall of the passage along axial tap section 16 is provided by inner edge 43 of block 40, while the opposite side wall is provided by an inner edge 44 of block 41; and one side wall of the passage along exit tap section 15 is provided by another inner edge 45.

Again in accordance with this invention, balls 21 extend through circular apertures 50 in plates 38 and 39, which are apertures countersunk on the inside to permit a sufficient portion of the balls to extend through. The balls are disposed in sockets 51 in block 35 and cover 36, respectively, which sockets permit a slight lateral and greater axial freedom of movement. Springs 22 extend through tapped holes 52 into engagement with the balls, and are held in place and compressed by set screws 53.

The restraining forces on the opposite sides of the nut may be equalized by providing springs having substantially equal compressive properties, and/or adjusting the set screws so that substantially the same force is exerted on each ball. In addition, upon any change in the operating conditions—such as due to nuts formed of different material necessitating a different rate of rotation of the tap, which produces a change in the centrifugal force tending to throw nuts out of the passage—the set screws may be adjusted, or springs of different properties used, to alter the restraining force of the balls to obtain the desired result—i. e., hold the end nut on the tap until a new nut is pushed on from the threaded section.

The restraining means of this invention has many advantages. Not only is an even flow of articles assured, but also the tool itself is maintained more accurately in alignment, since the equalized forces exerted by restraining means constructed in accordance with this invention are transmitted back down the line of articles extending around the curved portion of the tool.

The specific embodiment of this invention herein described also has particular advantages. It is relatively easy to provide a chuck with detent balls and springs of the type described; also, such balls and springs are relatively simple to adjust and take up very little space. In addition, after the restraining force is overcome, detent balls—or equivalent round-headed pins—eject the article with forces which are equalized on both sides of the nut. Thus, any tendency for the nut to bind at the outlet of the passage is minimized, and newly tooled surfaces, such as the threads of nuts N, are not damaged by the article being twisted about the end of the tool upon leaving.

Although a specific embodiment of this invention has been described with particularity, it will be understood that numerous variations are possible. For instance, round headed pins may be utilized instead of balls; the springs may have any desired form or shape; other means of exerting a restraining force, such as hydraulic or the like, may be utilized; and the construction of the chuck may be altered, with corresponding variations in the application of the principles of this invention. Also, the principles of this invention are applicable to different types of apparatus, other than tappers, such as drills, reamers, and the like. It will be further understood that other changes may be made without departing from the spirit and scope of this invention, as defined in the appended claim.

What is claimed is:

In a nut tapping machine, means for feeding polygonal nuts successively upon a tap, said tap having a relatively long and smooth flexible tail, a driven chuck for rotating said tap, means for securing said tap therein, a passage for said nuts between said feed and chuck and through said chuck to a lateral outlet therefrom, an ear rigidly attached to, adjacent the entrance of, and rotatable with said chuck, said passage polygonal in cross section, conforming to sides of said nuts, said ear presenting a substantially flat surface in alignment with one side of said chuck passage and also a beveled edge, whereby when a nut is not properly positioned when it arrives at said ear, it will be partially rotated thereby and aligned with said passage.

HENRY C. TANGOWSKI.